United States Patent
Legrand

(10) Patent No.: US 7,587,828 B2
(45) Date of Patent: Sep. 15, 2009

(54) CUTTING HEAD FOR A BRUSH CUTTER, EDGE TRIMMER OR SIMILAR

(75) Inventor: Emmanuel Legrand, Villeneuve (FR)

(73) Assignee: Speed France, Arnas (FR)

( * ) Notice: Subject to any disclaimer, the term of this patent is extended or adjusted under 35 U.S.C. 154(b) by 210 days.

(21) Appl. No.: 10/543,029

(22) PCT Filed: Jan. 23, 2004

(86) PCT No.: PCT/IB2004/000770

§ 371 (c)(1),
(2), (4) Date: Jul. 21, 2005

(87) PCT Pub. No.: WO2004/064492

PCT Pub. Date: Aug. 5, 2004

(65) Prior Publication Data

US 2006/0048396 A1 Mar. 9, 2006

(30) Foreign Application Priority Data

Jan. 23, 2003 (FR) .................................. 03 00712

(51) Int. Cl.
*A01D 34/416* (2006.01)
(52) U.S. Cl. .............................. 30/276; 30/347; 56/12.7
(58) Field of Classification Search .................. 30/276, 30/347; 56/12.7, 295
See application file for complete search history.

(56) References Cited

U.S. PATENT DOCUMENTS 2,434,533 A  1/1948  Wurzburger
3,066,366 A  12/1962 Wyckoff et al.
3,708,967 A  1/1973  Geist et al.
3,720,055 A  3/1973  de Mestral et al.
3,826,068 A  7/1974  Ballas et al.
4,035,912 A  7/1977  Ballas et al.

(Continued)

FOREIGN PATENT DOCUMENTS

| AU | 502953 | 8/1979 |
|---|---|---|
| DE | 1 704 986 | 3/1967 |
| DE | 4321650 | 10/1994 |
| DE | 19632721 | 2/1998 |
| DE | 19817883 | 11/1999 |

(Continued)

OTHER PUBLICATIONS

Photographs of Kwik Products Inc. Trimmer Head—Date of Manufacture Unknown.

(Continued)

*Primary Examiner*—Hwei-Siu C Payer
(74) *Attorney, Agent, or Firm*—Alston & Bird LLP

(57) ABSTRACT

A cutting head for a brush cutter, edge trimmer or similar, the head comprises a passageway (112) for a cutter string (300) and at least one curved surface (120) for supporting the string, the surface extending between an exit region (115) for said string from said passageway and a peripheral region of the head. According to the invention, the passageway extends (A) in a manner that is offset from an axis of rotation (C) of the head so as to present an inside edge constituted by its edge closest to said axis of rotation, said inner edge corresponding to a trailing edge of the string while the head is rotating, and the curved portion extends from said inner edge. This serves to reduce the radius of curvature of the curved portion without needing to increase the diameter of the head.

10 Claims, 6 Drawing Sheets

U.S. PATENT DOCUMENTS

| | | | |
|---|---|---|---|
| 4,043,037 A | | 8/1977 | Okamoto et al. |
| 4,054,992 A | * | 10/1977 | Ballas et al. .................. 56/12.7 |
| 4,054,993 A | | 10/1977 | Kamp et al. |
| 4,062,114 A | | 12/1977 | Luick |
| 4,067,108 A | | 1/1978 | Ballas |
| 4,104,797 A | | 8/1978 | Ballas |
| 4,118,865 A | | 10/1978 | Jacyno et al. |
| 4,126,990 A | | 11/1978 | Fisher et al. |
| 4,172,322 A | | 10/1979 | Ballas |
| 4,177,561 A | | 12/1979 | Ballas |
| 4,185,381 A | | 1/1980 | Palmieri et al. |
| 4,186,239 A | | 1/1980 | Mize et al. |
| 4,199,926 A | | 4/1980 | Petty |
| 4,209,902 A | | 7/1980 | Moore et al. |
| 4,238,866 A | | 12/1980 | Taylor |
| 4,271,595 A | | 6/1981 | Rahe |
| 4,282,653 A | | 8/1981 | Comer et al. |
| 4,301,642 A | | 11/1981 | Thurber |
| 4,335,510 A | | 6/1982 | Close et al. |
| 4,362,007 A | | 12/1982 | Kennedy et al. |
| 4,367,587 A | | 1/1983 | Kilmer |
| 4,411,069 A | | 10/1983 | Close et al. |
| 4,685,279 A | * | 8/1987 | Gullett ........................ 56/12.7 |
| 4,726,176 A | | 2/1988 | McGrew |
| 4,756,146 A | | 7/1988 | Rouse |
| 4,835,867 A | | 6/1989 | Collins et al. |
| 4,852,258 A | | 8/1989 | Foster |
| D303,603 S | | 9/1989 | Zimmerman |
| 4,869,055 A | | 9/1989 | Mickelson |
| 4,905,465 A | | 3/1990 | Jones et al. |
| 5,048,278 A | * | 9/1991 | Jones et al. .................... 56/295 |
| 5,220,774 A | | 6/1993 | Harbeke et al. |
| 5,276,968 A | | 1/1994 | Collins et al. |
| 5,398,416 A | | 3/1995 | Mackey |
| D358,535 S | | 5/1995 | Skinner |
| 5,430,943 A | | 7/1995 | Lee |
| 5,433,006 A | * | 7/1995 | Taguchi ........................ 56/295 |
| D364,079 S | | 11/1995 | Skinner |
| 5,463,815 A | | 11/1995 | Fogle |
| 5,524,350 A | | 6/1996 | Boland |
| D376,078 S | | 12/1996 | Skinner |
| D376,739 S | | 12/1996 | Skinner |
| D379,052 S | | 5/1997 | Skinner |
| 5,687,482 A | | 11/1997 | Behrendt |
| 5,709,942 A | | 1/1998 | Leydon et al. |
| 5,713,191 A | | 2/1998 | Welton |
| 5,758,424 A | | 6/1998 | Iacona et al. |
| 5,761,816 A | | 6/1998 | Morabit et al. |
| 5,765,287 A | | 6/1998 | Griffini et al. |
| 5,836,227 A | | 11/1998 | Dees, Jr. et al. |
| 5,852,876 A | | 12/1998 | Wang |
| 5,855,068 A | | 1/1999 | Zilly et al. |
| 5,887,348 A | | 3/1999 | Iacona et al. |
| 5,890,352 A | | 4/1999 | Molina |
| 5,896,666 A | | 4/1999 | Iacona et al. |
| 5,901,448 A | | 5/1999 | Lingerfelt |
| 5,979,064 A | | 11/1999 | Kitz et al. |
| 5,987,756 A | | 11/1999 | Yates et al. |
| 5,996,233 A | | 12/1999 | Morabit et al. |
| 6,018,840 A | | 2/2000 | Guay et al. |
| 6,032,442 A | | 3/2000 | Paolo |
| 6,035,618 A | | 3/2000 | Fogle |
| 6,045,911 A | | 4/2000 | Legrand et al. |
| 6,058,574 A | | 5/2000 | Facey et al. |
| 6,061,914 A | | 5/2000 | Legrand |
| 6,094,823 A | | 8/2000 | Brown et al. |
| 6,119,350 A | | 9/2000 | Sutliff et al. |
| 6,124,034 A | | 9/2000 | Proulx et al. |
| RE36,940 E | | 11/2000 | Fogle |
| 6,148,523 A | | 11/2000 | Everts et al. |
| 6,161,292 A | | 12/2000 | Morabit et al. |
| 6,240,643 B1 | | 6/2001 | Civalleri |
| 6,279,235 B1 | | 8/2001 | White et al. |
| 6,314,848 B2 | * | 11/2001 | Morabit et al. ................ 30/276 |
| 6,347,455 B2 | | 2/2002 | Brant et al. |
| 6,401,344 B1 | | 6/2002 | Moore et al. |
| 6,519,857 B1 | * | 2/2003 | Proulx et al. .................. 30/276 |
| 6,560,878 B2 | | 5/2003 | Skinner et al. |
| 6,581,292 B2 | | 6/2003 | Allis |
| 6,601,373 B1 | | 8/2003 | Legrand |
| 6,630,226 B1 | | 10/2003 | Legrand |
| 6,874,235 B1 | | 4/2005 | Legrand |
| 6,910,277 B2 | | 6/2005 | Proulx et al. |
| 6,912,789 B2 | | 7/2005 | Price, III |
| 6,928,741 B2 | | 8/2005 | Proulx et al. |
| 6,944,956 B1 | | 9/2005 | Fogle |
| 7,000,324 B2 | | 2/2006 | Fogle |
| 7,111,403 B2 | * | 9/2006 | Moore ......................... 30/276 |
| 7,257,898 B2 | | 8/2007 | Iacona |
| 2001/0027610 A1 | | 10/2001 | Wheeler et al. |
| 2002/0023356 A1 | | 2/2002 | Skinner et al. |
| 2003/0033718 A1 | | 2/2003 | Alliss |
| 2003/0200662 A1 | | 10/2003 | Moore |
| 2004/0128840 A1 | | 7/2004 | Proulx et al. |
| 2005/0028390 A1 | | 2/2005 | Legrand |
| 2005/0081389 A1 | | 4/2005 | Legrand |
| 2005/0172501 A1 | | 8/2005 | Fogle |
| 2005/0188547 A1 | | 9/2005 | Legrand |
| 2005/0229402 A1 | | 10/2005 | Iacona |
| 2007/0123092 A1 | | 5/2007 | Legrand |

FOREIGN PATENT DOCUMENTS

| | | |
|---|---|---|
| EP | 0 824 854 | 2/1998 |
| EP | 0867108 | 9/1998 |
| EP | 1057396 | 12/2000 |
| EP | 10888476 | 4/2001 |
| EP | 1 129 609 A1 | 9/2001 |
| JP | 63059812 A | 3/1988 |
| JP | 7184446 | 7/1995 |
| NL | 8302111 | 6/1986 |
| WO | WO 97/19584 | 6/1997 |
| WO | WO 97/43469 | 11/1997 |
| WO | WO 99/40773 | 8/1999 |

OTHER PUBLICATIONS

International Search Report for PCT/IB2004/000770 completed Jun. 18, 2004.

International Search Report for FA 661015 and FR 0500702 filed Sep. 6, 2005.

International Search Report for PCT/FR2004/000031 filed Aug. 30, 2004.

International Search Report for FR2004/000105 filed Sep. 29, 2004.

International Search Report for PCT/IB2004/000855 filed Jul. 15, 2004.

International Search Report for PCT/IB2004/000436 filed Jul. 1, 2004.

International Search Report for PCT/IB2004/000819 filed Jul. 8, 2004.

International Search Report for PCT/FR 01/02730 filed Apr. 25, 2002.

* cited by examiner

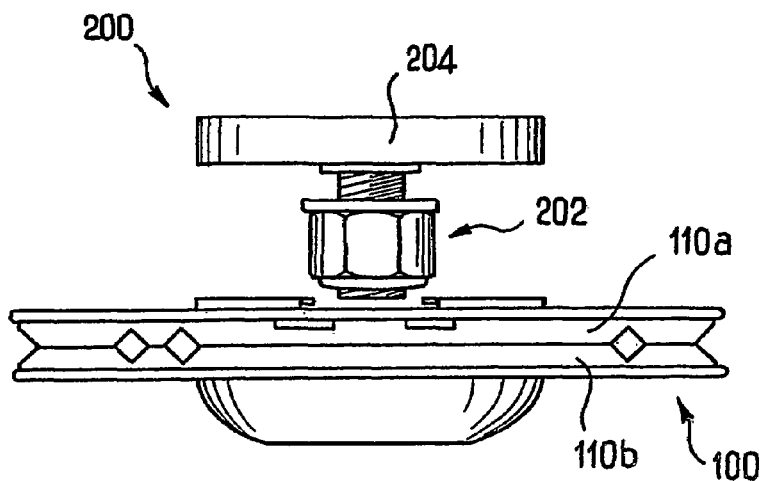
FIG_1
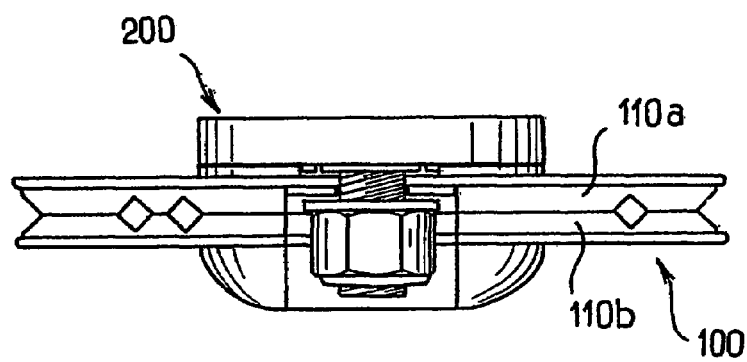
FIG_2
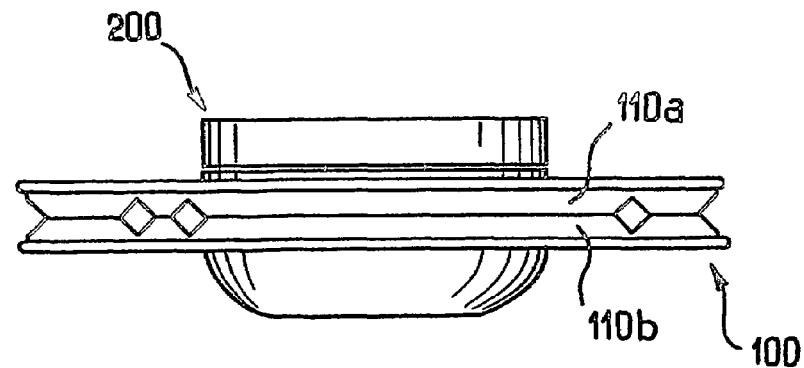
FIG_3

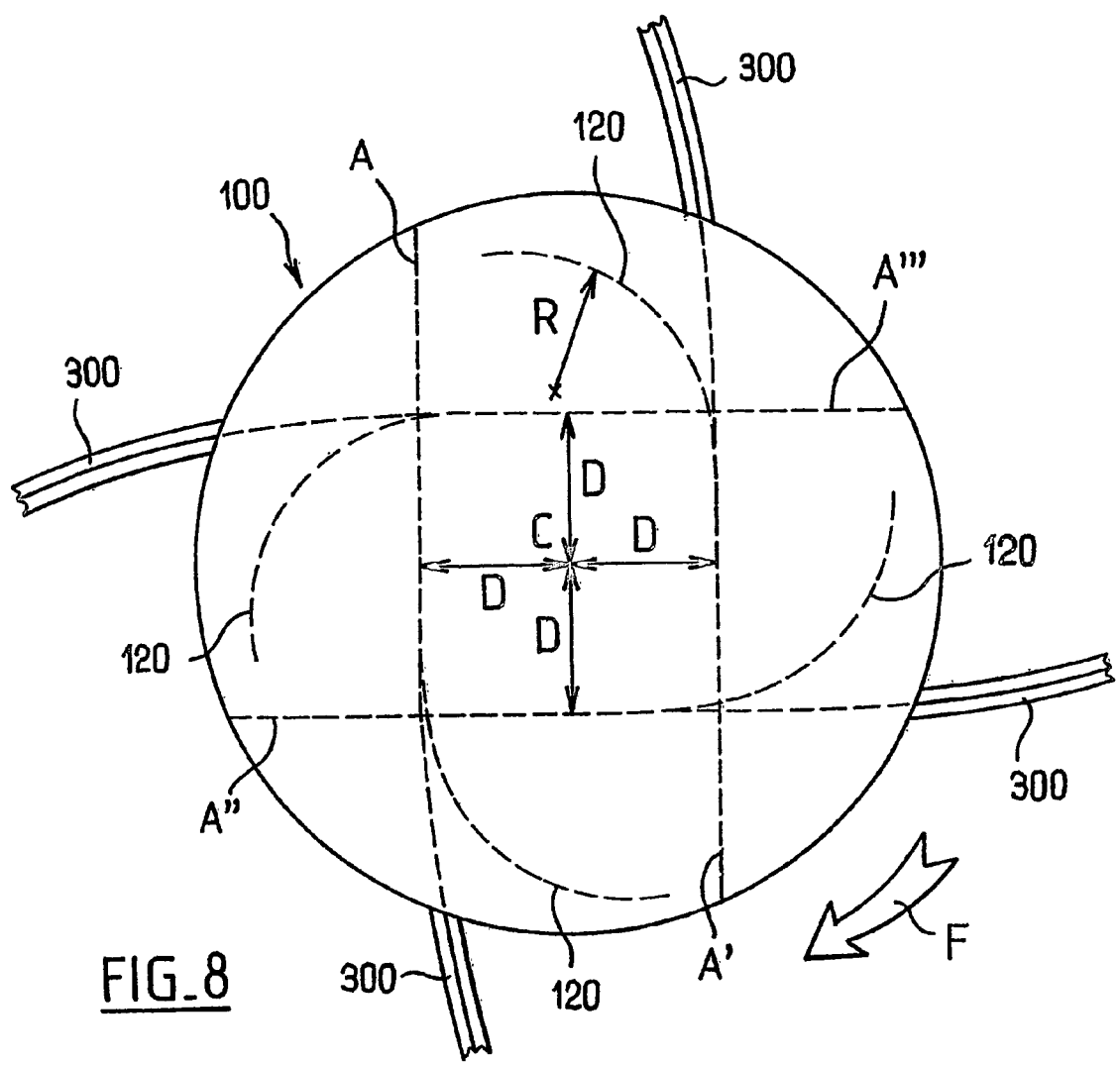
FIG._8
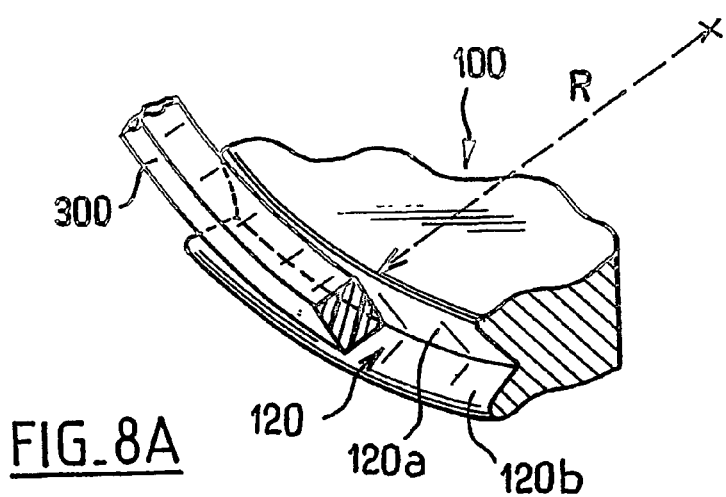
FIG._8A

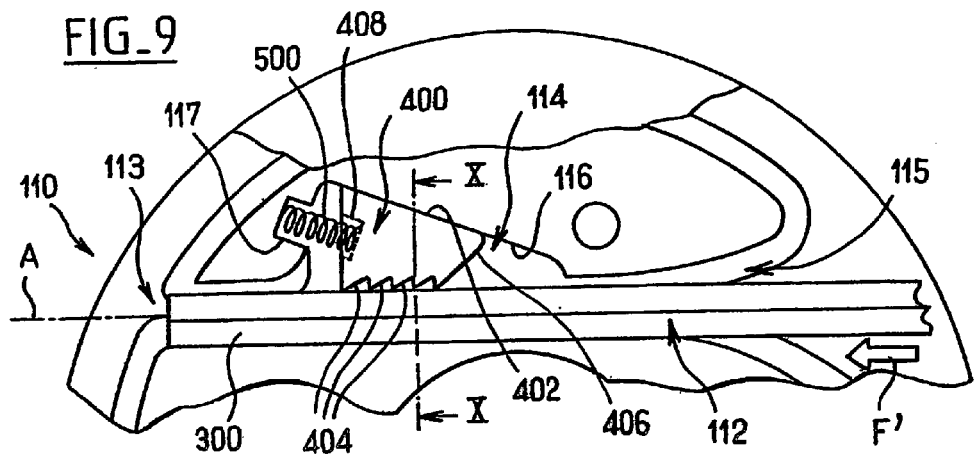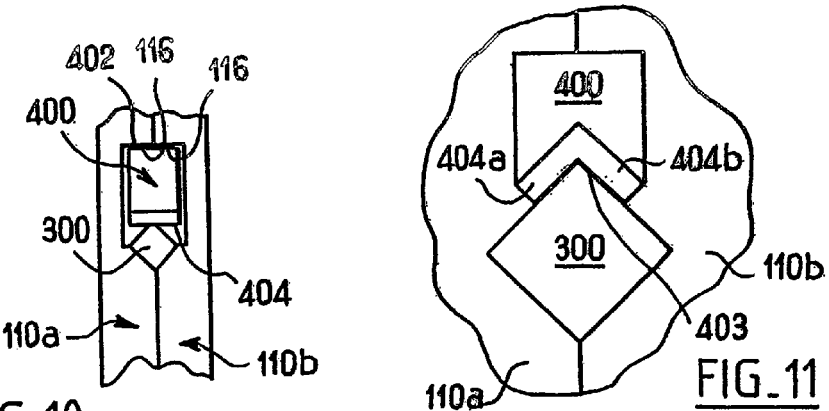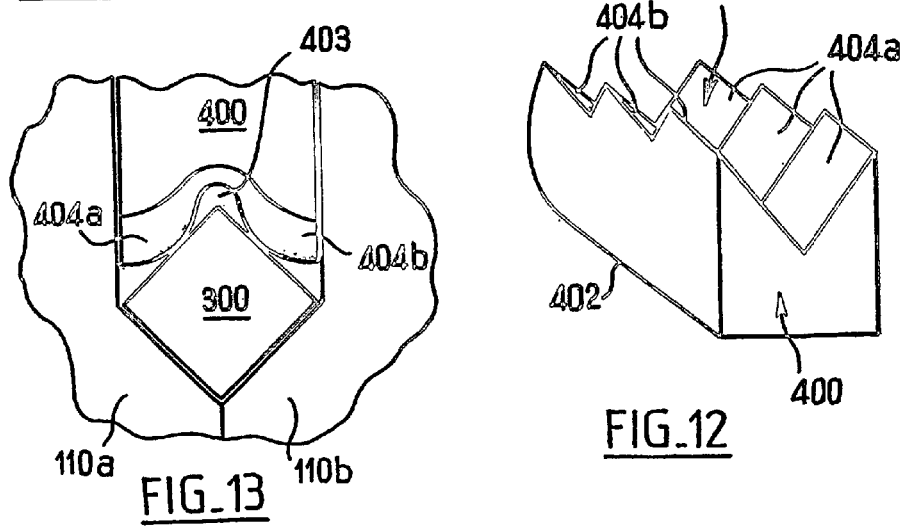

CUTTING HEAD FOR A BRUSH CUTTER, EDGE TRIMMER OR SIMILAR

The present invention concerns, in general the field of devices for cutting vegetation, such as brush cutters, edge trimmers, etc.

In this type of device, one or more cutting strings, unwound from a reserve or in the form of individual strands, are solidly attached to a cutting head driven in rotation by a motor driving the device, while extending substantially radially in relation to the axis of rotation.

In basic implementations, the string outlet passageways are often formed by metallic or similar eyelets mounted on a peripheral surface of the head and through them respective strands of string emerged from the head.

While the device is in use, with the cutting head spinning at high speed, the cutter string can be subjected to high levels of stress, in particular by robust pieces of vegetation (trunks, etc.) or by obstacles (rocks, etc.). Under such circumstances, the string tends to depart from the radial direction it would normally occupy under the effect of centrifugal force. As a result, the string is subjected to bending in the vicinity of the eyelet at levels that are extremely high both in amplitude and in frequency, and very often the string breaks in this region.

This requires the operator either to replace the string (when individual strands of string are used), or else to deliver a new length of string from a supply (a reel) situated inside the head, which operation is made all the more difficult by the string breaking in the vicinity of the eyelet, thereby preventing it from being directly accessible to the operator's fingers.

This operation is thus fiddly to perform in either case.

Cutting heads have also been developed in which curved string-support portions are provided on either side of a string outlet so as to limit the bending stresses to which the string is subjected when it is stressed as described above. This does indeed reduce stress on the string, and it breaks less frequently.

It should be observed that those prior art curved portions are effective with circular section polyamide strings of small diameter. Such strings bend easily to follow the curve of a curved portion without being subjected to excessive fatigue.

In contrast, such curved portions become much less effective with cutter strings for rougher work (clearing undergrowth, cutting very long grass, etc.), i.e. with strings of larger section and/or provided with special arrangements (such as teeth, harder material in the cutting zone, projections or indentations for reducing noise, etc.). The string can bend much less without being subjected to fatigue, and the string does not manage to follow the curved portion without suffering such fatigue.

In parallel, it is not possible to increase the radius of curvature of such curved portions without significantly increasing the diameter of the cutting head, and that is undesirable for reasons of size, weight, and expense, in particular. Given that it is necessary to provide, between the axis of rotation of the head and its periphery, both the curved portions and mounting arrangements for the string (blockers or sinuous paths, particularly for individual strands, a supply reel when an unreeling mechanism is provided), the curved portions can only have a radius of curvature that is relatively small.

The present invention seeks to mitigate those limitations of the prior art and to propose a cutting head in which the string outlet curved portion(s) can present a small radius of curvature (and thus one or more radii of curvature that are increased), without it being necessary to increase the diameter of the head correspondingly.

For this purpose, the invention provides a cutting head for brush cutter, edge trimmer or similar, the head being of the type including a passageway for a cutter string and at least one curved surface for supporting the string, the surface extending between an exit region for said string from said passageway and a peripheral region of the head, the head being characterized in that the passageway extends in a manner that is offset from an axis of rotation of the head so as to present an inner edge 112A constituted by its edge closest to said axis of rotation, said inner edge corresponding to a trailing edge of the string while the head is rotating, and in that the curved portion extends from said inner edge.

Certain preferred, but non-limiting, aspects of the cutting head are as follows:

the string passageway is essentially rectilinear;
the string passageway is situated at a given distance from the axis of rotation of the head, and the curved surface presents, at least locally, a radius of curvature that is greater than said distance;
the curved portion presents a radius of curvature that is constant, or else variable;
the curved portion joins the string passageway, and/or the peripheral region of the head, substantially tangentially;
a secondary curved portion is provided between an outer edge of the passageway opposite from its inner edge and the peripheral region of the head;
two string passageways and their respective curved portions are provided;
the two string passageways are situated on either side of the axis of rotation of the head, and the string outlets from the respective passageways are situated in diametrically-opposite regions of the head;
the cutter string presents a cross-section that is polygonal; and
the cutter string presents a width greater than about 3 mm.

The invention also provides a vegetation cutting device such as a brush cutter, edge trimmer or similar, characterized in that it includes a cutting head as defined above and a motor suitable for rotating said cutting head.

Other aspects, aims and advantages of the present invention will appear more clearly from the following detailed description of the preferred embodiments of the latter, given by way of non-limitative example and made with reference to the appended drawings in which:

FIGS. 1 to 3 are three views in side elevation illustrating a cutting head according to one embodiment of the invention.

FIG. 8 is a schematic plan view of the cutting head in FIG. 7 (at rest), with four strands of cutting string mounted in the latter.

FIG. 8A shows in perspective a curved bearing zone defined by the cutting head for one of the strands.

FIG. 9 illustrates a detail of the disc-shaped part in FIG. 4, fitted with a device for locking a strand of string.

FIG. 10 is a view in cross-section along the line X-X in FIG. 9.

FIG. 11 is a cross-sectional view of a first variant of embodiment of the string locking device.

FIG. 12 is a view in perspective of a locking member belonging to the locking device in FIG. 11.

FIG. 13 is a cross-sectional view of a second variant of embodiment of the string locking device.

It will be noted as a preliminary matter that, from one figure to the other, the identical or similar elements or parts have, wherever possible, been identified by the same reference marks.

Figure 4:
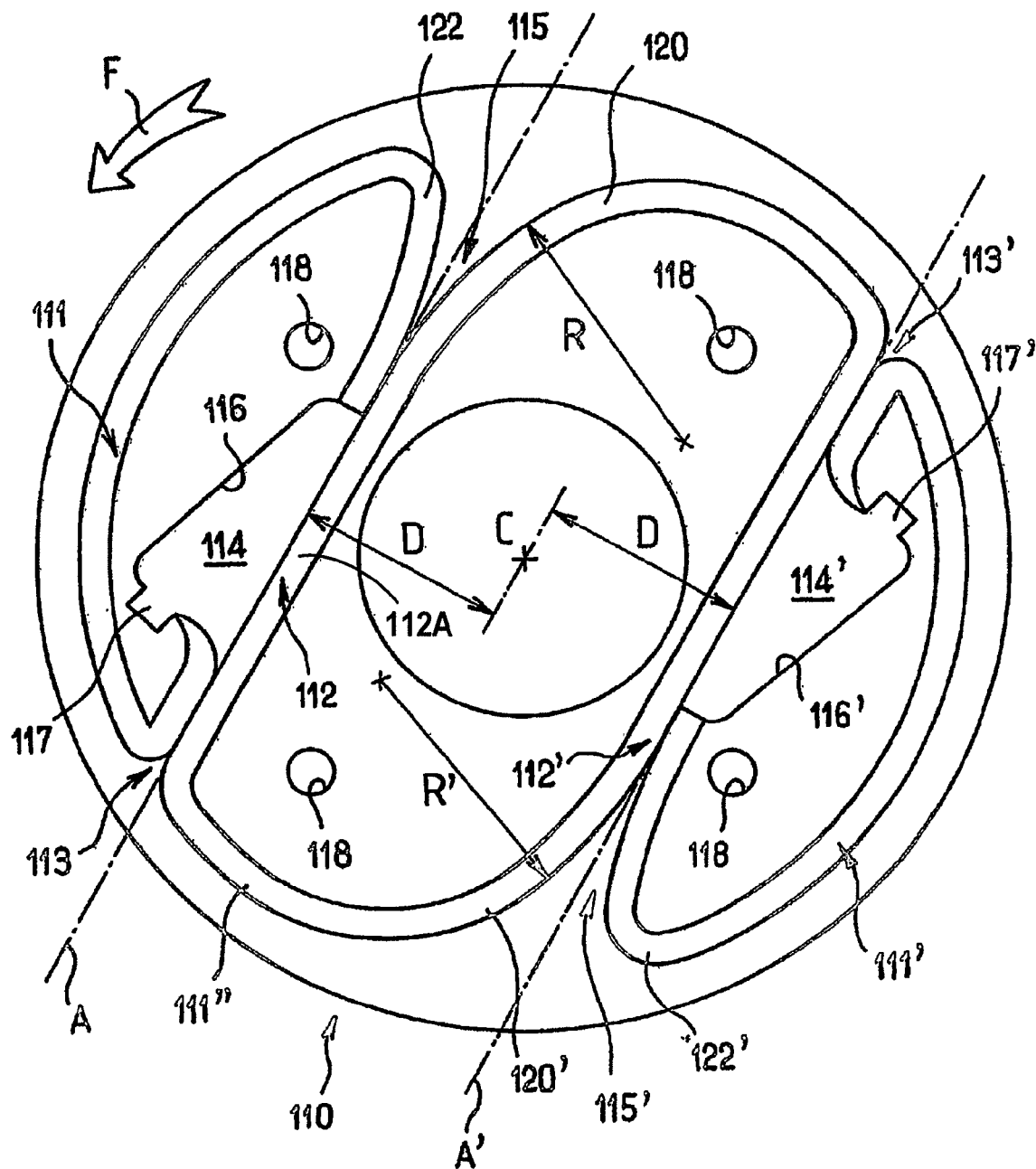
FIG. 4 is a plan view of a generally disc-shaped part constituting a portion of a cutting head according to the invention.

FIGS. 1 to 3 represent a cutting head for a brush cutter, edge trimmer and similar according to the invention, globally identified by the reference 100, suitable for being mounted on the extremity of a drive shaft 200 provided for the purpose, fixing arrangements 202 (washer, nut, mechanism of indexation in rotation), as well as a counterplate intended to cooperate with the said fixing arrangements in a manner completely conventional in itself.

The cutting head is implemented here by overlaying and assembling two disc-shaped parts 110a and 110b concentric with the axis of rotation of the drive shaft 200 and comprising, on their faces turned one towards the other, arrangements for running of strands of string and for retaining those strands as will be seen in detail below.

FIG. 1 illustrates the cutting head 100 before assembly to the shaft 200, whereas FIGS. 2 and 3 illustrate, respectively in a view with partial cutaway and a view in elevation, the cutting head mounted on the shaft.

With reference now to FIG. 4, this shows a disc-shaped part 110 (possibly one of the parts 110a and 110b in FIGS. 1 to 3) contributing to the implementation of the cutting head. It is provided with a central orifice through which the drive shaft 200 can pass.

This part 110 comprises a set of 45° bevels 111, 111' (outer bevels) and 111" (central bevel) delimiting internally the portions of the part that are raised and externally the portions of the part that are recess. The overall contour of the bevels is here circular and follows the contour of the disc, set back at a certain distance from this contour.

In particular, two bevels 111, 111" extend in a rectilinear and adjacent manner the one to the other to delimit a first zone 112 of cutting string strand passageway, this passageway opening onto the outside at a first opening 113 and a second opening 115, for the outlet of a strand of a cutting string. The axis A along which the zone 112 extends is situated a certain distance, marked D, from the centre C of the disc-shaped part.

At the opening 113, the bevels define a first curved bearing zone. The radius of curvature of the bevels is small, it being simply to guide the strand of string when it is put in place.

At the string outlet 115, the bevel 111" defines a second curved bearing zone 120 having a different radius of curvature than the first curved bearing zone, connected for preference without change of slope on the one hand with the string passageway zone 112 and on the other hand with the circular peripheral zone formed jointly by the three bevels. This curved bearing zone 120 supports the strand of string during cuffing, in particular when, when the cuffing head rotates, it encounters obstacles resisting cuffing and causing it to give way (the direction of rotation of the cuffing head being given by the arrow F). It is important to note here, according to one aspect of the invention, that, due to the lateral offset of the string passageway 112 in relation to the centre C of the part 110, that is in relation to the axis of rotation of the cuffing head, it is possible to give the curved bearing zone 120 a radius of curvature which is much greater than that which could be achieved, as in the prior art, with a string passageway extending geometrically from the centre C.

Specifically, in the case of the prior art, knowing that the central zone of the cutting head is necessarily occupied by the shaft, very little room is available in the axial direction for implementing on the one hand the locking of the strand of cutting string, and on the other hand the curved bearing surface.

On the contrary, due to the arrangement of the invention, a much greater radius of curvature R can be envisaged and this can (at least locally) be equal to or even significantly greater than the distance D.

It will be noted here that the curved bearing zone may have any curved geometric shape required (circular, with circular sectors of different radius, elliptical, parabolic, etc.). It will be understood in particular that there may be one or more constant radii of curvature, and/or one radius of curvature varying continuously.

Due to a less pronounced curvature of the curved bearing zone, the actions are very considerably reduced as is the fatigue of the strand of string, because the material of the latter is much less stressed, and this is particularly important with modern cutting strings comprising arrangements (teeth, etc.) intended to facilitate cutting, and/or arrangements (recesses, protrusions, etc) intended to reduce noise during rotation, and/or zones of different materials (filled polyamides, etc.) intended for example to increase wear resistance.

The disc-shaped part 110 also comprises, on a section of the string strand passageway zone 112, a cavity 114 intended to receive a string locking shoe that will be described later. For the moment, mention will be made here that this cavity opens out onto the string passageway zone and comprises on the opposite side a vertical, unbevelled surface oriented at an angle relative to the axis A of the string passageway 112, and also comprises, adjacent to the extremity of the surface 116 furthest away from the axis A, a blind recess 117 intended for the wedging of a shoe pressure spring as will be seen in detail later.

Also represented in FIG. 4 are holes 118 suitable for being traversed by screws or studs for the assembly of the part 110 with one or more other disc-shaped parts, designed in similar manner.

Finally, FIG. 4 shows that the part 110 comprises, with a symmetry of revolution of 180° relative to the arrangements described above, some second passageway, bearing and locking arrangements for a second strand of string, these arrangements being indicated by the same reference marks plus a "prime" mark.

Figure 5:
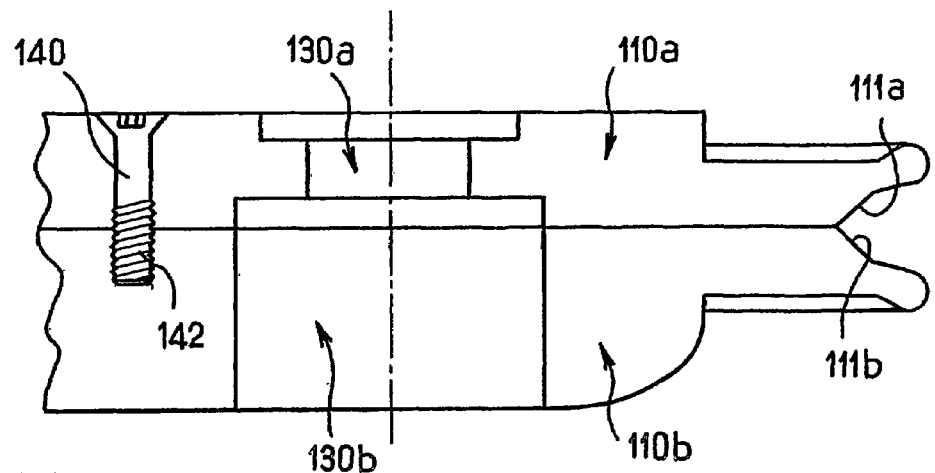
FIG. 5 is a profile view of two disc-shaped parts assembled to form the cutting head.

FIG. 5 shows in greater detail a cutting head implemented by assembling a first disc-shaped part 110a, comprising the arrangements as illustrated in FIG. 4, and a second disc-shaped part 110b comprising corresponding arrangements, with a mirror symmetry, such that all these arrangements are placed on top of their counterparts belonging to the other part 110a during assembly.

It is understood that such an assembly forms string strand passageways in regular lozenge shape. By using strands of cutting string of generally square cross-section and slightly smaller than the cross-section of the passageways formed in the head, these passageways retain the strands in an inclination such that it is a ridge of each string strand which will constitute a leading zone for cutting, to thus improve cutting efficiency.

It will be observed however that such a head may be used with cutting string strands of any cross-section, provided that they can be engaged without being trapped in a string passageway.

It is understood that, on the basis of the arrangements as described with reference to FIG. 4, FIG. 5 implements a cutting head with two strings situated at the same level in vertical direction and exiting from the head in an oblique direction relative to a strictly radial direction, in two diametrically opposed places.

Figure 6:
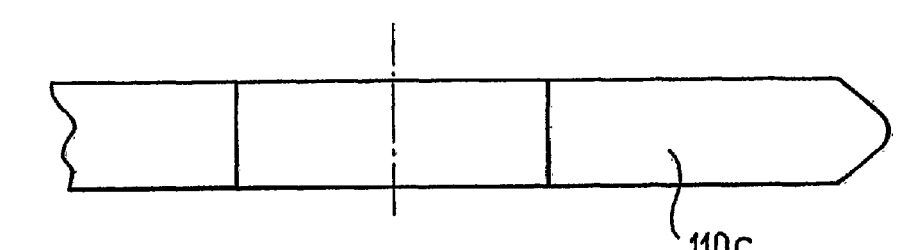
FIG. 6 is a profile view of a generally disc-shaped intermediate part that can, with two other parts, form another cutting head according to the invention.

FIG. 6 illustrates in elevation another disc-shaped part 110c, constituting a third intermediate part of the head.

This part 110c comprises two sets of arrangements like those represented in FIG. 4, respectively on each of its two faces, with preferably a mutual offset of 90°. One of these sets of arrangements forms counterpart arrangements of those of the part 110a, whereas the other of these sets of arrangements forms counterpart arrangements of those of the part 110b. As a corollary, to fit the intermediate part 110c, the arrangements of the parts 110a and 110b are mutually offset at a 90° angle.

It is understood that, in this way, a cutting head is implemented comprising an upper level with two string strands with diametrically opposed outlets, and a lower level with two other string strands with diametrically opposed outlets also, but offset by 90° in relation to the first ones.

Figure 7:
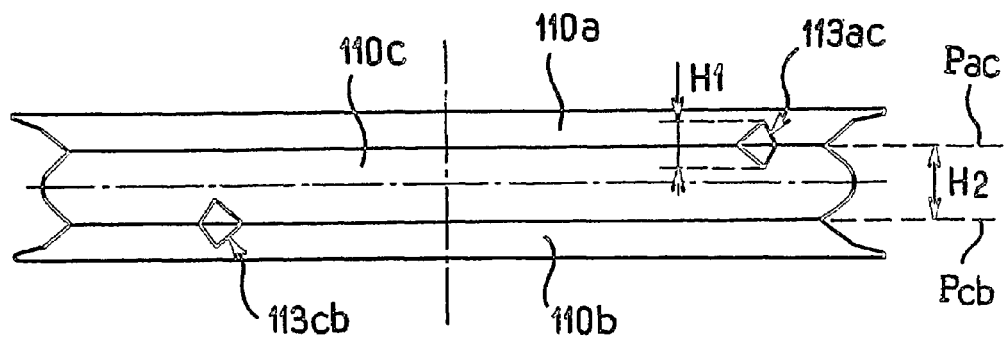
FIG. 7 is a profile view of this other cutting head in the assembled state.

This cutting head is illustrated in elevation in FIG. 7. Shown in this figure are two openings, respectively 113ac and 113cb, offset at an angle of 90° and belonging respectively to the two levels, the openings for the outlet of the strings not having been represented in this figure.

It has been observed that such an arrangement of strings, with two levels, advantageously provided chopping of the cut plant material when the distance between the planes of the string levels was well chosen. More particularly, and still with reference to FIG. 7, it has been observed that, if the distance H2 between the respective planes Pab and Pbc of the two string levels is equal to or greater than approximately 1.8 times the height H1 of a string (corresponding substantially to the height of its passageway), and preferably equal to or less than approximately 5 times this same height H1, then particularly satisfactory chopping is obtained. For example, with a string of square cross-section with a side length of 4 mm, that is a diagonal measuring approximately 5.6 mm, the height offset between the two cutting planes is greater than approximately 10 mm.

In such a configuration, chopping is equally favoured if, as described above, the string outlets are offset at an angle to one another. For preference, and as also described, this offset is such that, in circumferential direction, the string outlets are regularly spaced.

However, irregularly spaced string outlets (which is obtained in particular if the angular offset between the arrangements of the upper level and those of the lower level is not 90°), a satisfactory result is also obtained.

FIG. 8 represents a schematic view from above of the cutting head in FIG. 7 at rest. Installed in this cutting head are four strands of string 300 which project at the string outlet 115 and which stop substantially at the openings 113. Also represented in this figure are the curved bearing surfaces 120 for the strands of string. The direction in which the head would be rotated when not at rest is illustrated by the arrow F.

In addition, it is understood in light of the foregoing that by using two intermediate parts of the type of part 110c, or more, and two terminal parts 110a and 110, a head can be implemented with any number of levels.

For example, by using an intermediate part that has its upper and lower arrangements mutually offset by 60°, and by providing two of such intermediate parts between the upper and lower parts 110a, 110b, a three-level cutting head is implemented with string outlets regularly distributed in a circumferential direction.

FIG. 8A illustrates in perspective the curved bearing surface 120 formed by the head for one individual strand of string 300, represented by a part of its length.

It is understood that such a curved bearing surface is formed by the curved bearing zones 120a, 120b of the two adjacent disc-shaped parts 110a and 110b (in the case of a version such as the one in FIG. 5), which in turn belong to the 45° bevels 111" of the respective parts.

This curved bearing surface therefore presents a V-shaped profile with a 90° bottom angle, that is a profile suited to the cross-section of the string 300 at the outlet of its passageway. Such a bearing surface is therefore used to retain the string in its optimal cutting orientation at all times, and in particular when, under the effect of resistance from the plants, it comes to rest against the bearing surface 120.

Naturally, the profile of the curved bearing surface will be adapted according to the type of cross-section of the string. In this regard, even in the case of a string of circular cross-section, it can be envisaged that the string rests on a curved bearing zone having a recessed circular profile. This minimizes the fatigue of the string and increases the cutting efficiency by stabilizing its trajectory in the cutting plane when it comes to rest against the said zone. In particular, it avoids wasting kinetic energy in a direction transverse to the direction of cutting (vertical direction in use).

FIGS. 9 and 10 illustrate the string locking mechanism, mounted inside a pair of disc-shaped parts (parts 110a and 110b in the basic form of implementation with a single cutting level). This mechanism comprises a shoe 400 placed in a housing defined by the cavity 114 formed in one of the disc-shaped parts (see FIG. 4), here 110a, and by the counterpart cavity defined in the other disc-shaped part, here 110b, which is juxtaposed to it.

This shoe 400 possesses a first face possessing a plurality of teeth 404 extending transversely to the axis A of the string passageway 112 and intended to bite into the cutting string 300 engaged in the said passageway 112, and an opposite face 402 extending at an oblique angle relative to the abovementioned first face and intended to rest against the rear face of its housing, defined by the faces 116 of the two disc-shaped parts.

A pressure spring 500 acts between a spring seat defined jointly by the blind recesses 117 of the two disc-shaped parts, and a recess 408 formed in a pressure region of the shoe 400, situated in the region of greatest height of the said shoe.

On the opposite side (front side), the shoe possesses an inclined section 406 directed at an oblique angle towards the top from the tooth 404 situated furthest forward.

The cutting strand of string 300, pre-cut to the required length, is engaged in its passageway 112 from its outlet opening 115, in the direction of the arrow F' in FIG. 9. Thus, it pushes back the shoe 400 against the (moderate) force of the spring 500, the shoe thus being able to rise by sliding against the rear face 116, 116 of its housing by the amount necessary to let the strand of string pass. The strand of string is pushed preferably until its left-hand extremity in FIG. 9 reaches the region of the opening 113, as illustrated in this same figure. The operator can thus ensure that the string has been fully engaged beyond the locking shoe. It will be noted here that the inclined front section 406 guides the strand of string so that it passes correctly under the shoe 400, on the toothed side.

It is well understood that, as soon as a pulling force is exerted on the strand of string in the direction opposite to the arrow F', which is typically the case when the device is working, by friction and impacts against the plants, the shoe 400, which acts as a one-way lock, tends to exert on the strand of string 300, through its teeth 404, a retention force by gripping which is all the greater as the pulling force increases, this being so due to the inclined face 116, 116 of the housing, providing a wedge effect in cooperation with the face 402 of the shoe.

Particular advantages of such a locking mechanism with sliding shoe, in particular when compared with the known mechanisms with toothed cam or similar, reside on the one hand in that the retention force exerted on the strand of string by the shoe, supported extremely firmly and solidly by the rear surface 116, 116 of the shoe housing 114, 114, can be extremely strong and on the other hand in that the extent, according to the length of the string 300, over which the teeth 404 cooperate with the string, can be much greater than with a known cam mechanism.

Other advantages are (i) that the strand of string can be easily inserted into the passageway through the opening 115 and easily removed from the passageway through the opposite opening 113, both being located at the periphery of the head, and (ii) that the locking mechanism can be placed between the passageway 112 and the periphery of the head, i.e. without interfering with the central region of the head in which the arrangements (recess for shaft and nut) for mounting the head on the cutting device are to be positioned.

In the embodiment in FIGS. 9 and 10, and as is shown in FIG. 10, the teeth 404 retaining the strand of string extend in a rectilinear manner in a direction transverse to the string.

According to another advantageous aspect, it can be envisaged that the string strand locking element (moreover whether it is a sliding shoe, a pivoting cam, or any other gripping element), is shaped in a manner to improve the retention of the string.

Thus, while in FIGS. 9 and 10 the cooperation between the teeth 404 and the string occurs simply at the level of the string ridge situated opposite the shoe, it is envisaged, as illustrated in FIGS. 11 and 12, that the teeth adopt a profile suited to the shape of the string. In these figures, there are two series of teeth 404a, 404b oriented at 90° to one another to form a profile comprising a recess 403. As a result, each series of teeth may cooperate with a whole face, or a substantial part of such a face, of a string in the case in point of a square cross-section, and the extent of the cooperation between the shoe and the string to retain the latter is further increased.

More generally, any recessed profile can be envisaged at the level of the teeth of the shoe 400 to better receive the string, irrespective of the shape of the cross-section of the latter.

Thus FIG. 13 illustrates the case in which the region of the teeth of the shoe 400 has a profile with a central curved recess, and two series of teeth 404a, 404b of convex profile either side of this recess. In this case, it is primarily the double row of contact between the teeth and the string which increases the gripping force.

It will be observed here that the locking shoes in FIGS. 11, 12 and 13 have an improved string retention efficiency not only with a string of square cross-section disposed as a lozenge, as described, but also with many other cross-sections of string, and in particular a circular cross-section.

Figure 14:
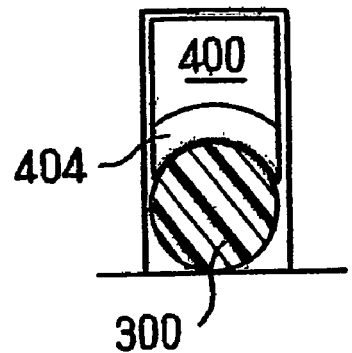
FIG. 14 is a cross-sectional view of a third variant of the string locking device.

FIG. 14 for its part illustrates the case in which, with a cutting string 300 of circular cross-section, use is made of a row of teeth 404 having a convexity suitable for receiving the string, with a radius of curvature of the string and a radius of curvature of the profile of the teeth preferably similar to one another.

It is understood that the use of the string locking element with a recessed profile zone of contact with the string applies not only to the case of a shoe, but also to the case of an element of another type such as a cam.

Figure 15:
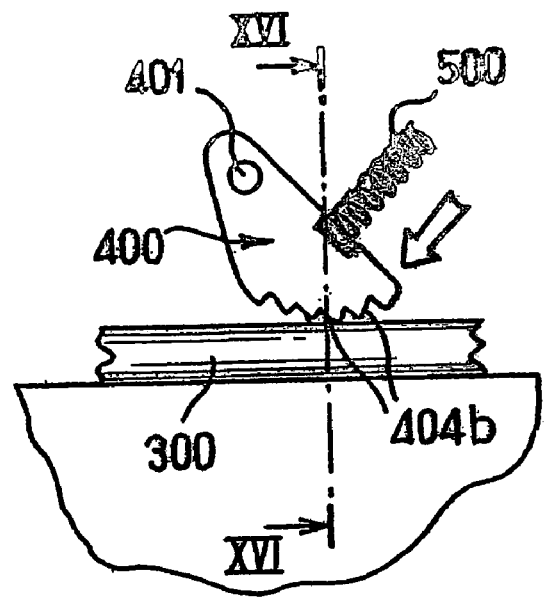
FIG. 15 is a plan view of a fourth variant of the string locking device.
Figure 16:
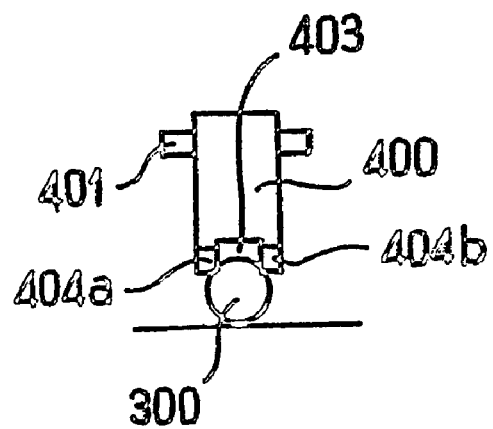
FIG. 16 is a view in section along the line XVI-XVI in FIG. 15.

Thus FIGS. 15 and 16 illustrate the locking of a cutting string 300, in this case of circular cross-section, with the aid of a cam 400 mounted on a pivot 401 and acted upon by a pressure spring 500. The teeth 404 are disposed on a circular sector eccentric in relation to the axis of rotation defined by the pivot 401.

It is observed in this embodiment that the cam has two rows of teeth 404a, 404b generally straight in the extension of one another (see FIG. 16), these two rows being separated by a central groove 403. Such a profile of teeth here further improves the locking of the string with many shapes of string.

Naturally, the present invention is not limited to the embodiments described and represented, and those skilled in the art will be able to provide many variants and modifications.

Moreover, it is understood that the different aspects of the new cutting head described in the foregoing may most frequently be implemented independently of one another or combined in different manners.

The invention claimed is:

1. A cutting head for brush cutter or edge trimmer, the head being of the type including a passageway for a cutter string and at least one curved portion for supporting the string, the curved portion extending from said passageway and between an exit region for said string and a peripheral region of the head, the head being characterized in that the passageway is essentially linear and extends along an axis (A) that is spaced a distance (D) from an axis of rotation (C) of the head so as to present an inner edge constituted by its edge closest to said axis of rotation, said inner edge configured for engaging a trailing edge of the string while the head is rotating, and in that the curved portion presents, at least locally, a radius of curvature (R) that is greater than said distance and extends from said inner edge.

2. A cutting head according to claim 1, characterized in that the curved portion presents a radius of curvature that is constant.

3. A cutting head according to claim 1, characterized in that the curved portion presents a radius of curvature that is variable.

4. A cutting head according to claim 1, characterized in that the curved portion joins the string passageway substantially tangentially.

5. A cutting head according to claim 1, characterized in that the curved portion joins the peripheral region of the head substantially tangentially.

6. A cutting head according to claim 1, characterized in that a secondary curved portion is provided between an outer edge of the passageway opposite from its inner edge and the peripheral region of the head.

7. A cutting head according to claim 1, characterized in that two string passageways and respective curved portions are provided.

8. A cutting head according to claim 7, characterized in that the two string passageways are situated on either side of the axis of rotation of the head, and in that the exit regions from the respective passageways are situated in diametrically-opposite regions of the head.

9. A cutting head according to claim 1, characterized in that the string passageway is configured for receiving a cutter string having a polygonal cross-section.

10. A cutting head according to claim 9, characterized in that the string passageway is configured for receiving a cutter string having a width greater than about 3 mm.

* * * * *

UNITED STATES PATENT AND TRADEMARK OFFICE
CERTIFICATE OF CORRECTION

PATENT NO.       : 7,587,828 B2                                              Page 1 of 1
APPLICATION NO.  : 10/543029
DATED            : September 15, 2009
INVENTOR(S)      : Legrand It is certified that error appears in the above-identified patent and that said Letters Patent is hereby corrected as shown below:

Column 8,

Lines 52 and 60, "cuffing" should read --cutting--.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO.        : 7,587,828 B2                                              Page 1 of 1
APPLICATION NO.   : 10/543029
DATED             : September 15, 2009
INVENTOR(S)       : Emmanuel Legrand It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 231 days.

Signed and Sealed this

Twenty-first Day of September, 2010

David J. Kappos
*Director of the United States Patent and Trademark Office*